United States Patent [19]

Moriya

[11] 4,418,366
[45] Nov. 29, 1983

[54] HEAD CONTROL AND SIGNAL SELECTOR FOR PLAYBACK AT HIGH-SPEED OF HELICAL SCAN VIDEO TAPE

[75] Inventor: Ryusuke Moriya, Hadano, Japan

[73] Assignee: Sony Corporation, Tokyo, Japan

[21] Appl. No.: 317,905

[22] Filed: Nov. 3, 1981

[30] Foreign Application Priority Data

Nov. 12, 1980 [JP] Japan .................. 55-159112

[51] Int. Cl.³ ............................................ G11B 5/008
[52] U.S. Cl. ..................................... 360/75; 360/10.2; 360/10.3; 360/38.1
[58] Field of Search ........................ 360/75, 10.3, 10.2, 360/38.1

[56] References Cited

U.S. PATENT DOCUMENTS

| | | | |
|---|---|---|---|
| 4,183,067 | 1/1980 | Kihara et al. | 360/75 |
| 4,189,758 | 2/1980 | Morio et al. | 360/77 |
| 4,197,562 | 4/1980 | Kikuya et al. | 360/10.3 |

FOREIGN PATENT DOCUMENTS

| | | | |
|---|---|---|---|
| 46-39776 | 11/1971 | Japan | 360/10.3 |
| 47-2136 | 1/1972 | Japan | 360/10.3 |
| 52-71214 | 6/1977 | Japan | 360/38.1 |
| 55-104184 | 9/1980 | Japan | 360/10.3 |
| 2070842 | 9/1981 | United Kingdom | 360/10.3 |

*Primary Examiner*—George G. Stellar
*Attorney, Agent, or Firm*—Lewis H. Eslinger; Alvin Sinderbrand

[57] ABSTRACT

A video signal reproducing apparatus for high-speed playback comprises a fixed head mounted on a rotary head drum, and a movable head supported on the head drum so as to lag the fixed head by a predetermined phase, and mounted on a bimorph plate so that the position of the movable head can be controlled transversely of a skew track on a magnetic tape. A delay circuit matches the phases of the signals reproduced by the fixed and movable heads, and in dependence on the levels of the reproduced signals the scanning path of the movable head is adjusted relative to the scanning path of the fixed head such that a reduction in one reproduced signal level causes an increase in the other reproduced signal level when the reproduced signals are phase-matched. The output is then complemented by at all times selecting the higher level reproduced signal with a selection switch.

6 Claims, 6 Drawing Figures

HEAD CONTROL AND SIGNAL SELECTOR FOR PLAYBACK AT HIGH-SPEED OF HELICAL SCAN VIDEO TAPE

BACKGROUND OF THE INVENTION

1. Field of the Invention

This invention relates to video signal reproducing apparatus, and more particularly to such apparatus comprising a fixed head mounted on a rotary head drum and a movable head supported on said rotary head drum so as to have a predetermined phase difference relative to said fixed head and supported by a position control means so that the position of said movable head can be controlled in the traverse direction of a skew track formed on a magnetic tape.

2. Description of the Prior Art

A video tape recorder (VTR) of the helical scanning type is sometimes operated at tape speeds in the range of some two to three times to twenty to thirty times the normal speed for the purpose of searching for a desired picture sequence during reproduction or editing. In this case, the head scans across some tracks and across the guard bands between adjacent tracks. This results in band noise in the reproduced picture and also a degraded picture due to the periodical loss of picture information.

In some recording systems the recording density is increased by omitting the guard bands between adjacent tracks, and in this case the azimuths of the transducer gaps of the magnetic heads used for recording and reproducing alternate tracks are different, in order to minimize the cross-talk during reproduction. But with this system also there are problems of band noise and degraded pictures during high speed reproduction.

OBJECTS AND SUMMARY OF THE INVENTION

One object of the present invention is to provide a video signal reproducing apparatus in which these problems are overcome.

Another object of the present invention is to provide a video signal reproducing apparatus in which two reproduced signals are derived and the higher level reproduced signal is used as the output.

Another object of the present invention is to provide a video signal reproducing apparatus in which two offset reproduction heads respectively derive two reproduced signals, the scanning path of one of the heads is adjustable, the reproduced signals are phase-matched, and the higher level reproduced signal is used as the output.

According to the present invention there is provided a video signal reproducing apparatus comprising a fixed head mounted on a rotary head drum and a movable head supported on the rotary head drum so as to have a predetermined phase difference relative to the fixed head and supported by a position control means so that the position of the moveable head can be controlled in the traverse direction of a skew track formed on a magnetic tape;

a circuit for matching the phase of a reproduced signal from the fixed head and a reproduced signal from the movable head;

a circuit for adjusting the scanning path of the movable head relative to the scanning path of the fixed head by controlling said position control means such that a reduction in one reproduced signal level causes an increase in the other reproduced signal level in the phase-matched state during high-speed reproduction; and a circuit for complementing one reproduced signal with the other reproduced signal for lower level portions.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
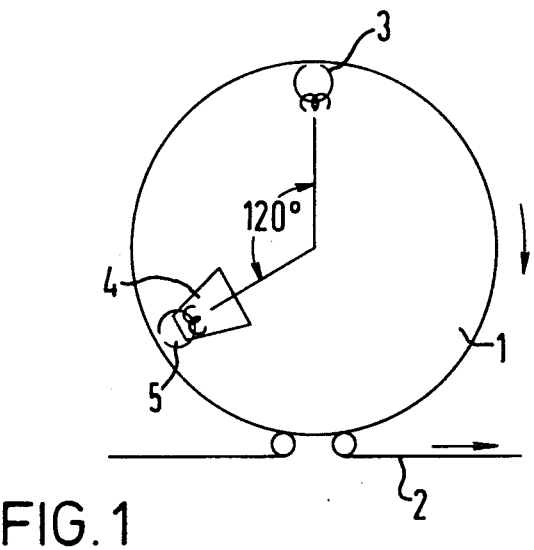
FIG. 1 is a schematic plan view of a rotary head drum of a video-tape recorder.

FIG. 1 is a schematic plan view of a rotary head drum 1 of a single head video-tape recorder (VTR) embodying the present invention, in which a magnetic tape 2 is wound in omega-shape around the head drum 1, and a recording and reproducing magnetic head 3 (the fixed head) is fixed on the head drum 1. One end of a bimorph plate 4 is fixed to the head drum 1 at the position corresponding to a 120° phase lag from the fixed head 3 with respect to the rotational direction (shown by the arrow) of the head drum 1, and a reproducing magnetic head 5 (the movable head) is mounted on the free end of the bimorph plate 4. The movable head 5 is controlled in position in the traverse direction (that is, perpendicular to the head scanning direction) of the recording tracks formed on the magnetic tape 2. Thus the movable head 5 is a dynamic tracking head.

The bimorph plate 4 is formed by a lamination of two pieces of piezoceramic material, and it can be bent vertically by application of a voltage between electrodes thereon. Alternatively, the bimorph plate 4 may be replaced by some other suitable electromechanical transducer, such as a moving coil or a moving magnet.

Figure 2:
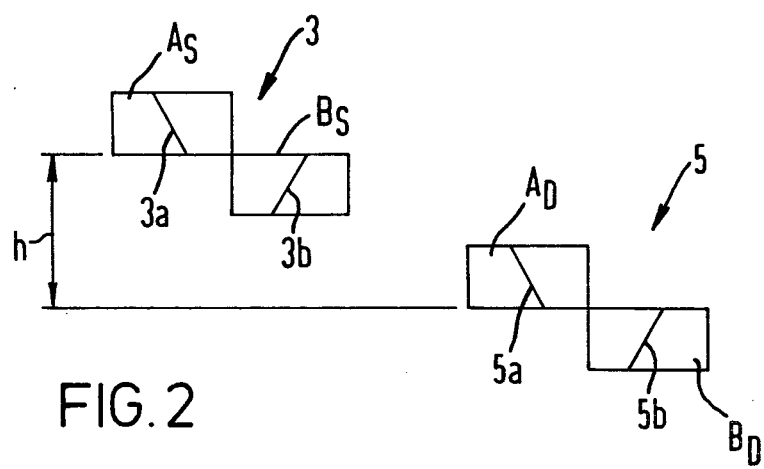
FIG. 2 is a schematic front view of a fixed rotary magnetic head and a movable rotary magnetic head shown in FIG. 1.

FIG. 2 is a schematic front view of the fixed head 3 and the movable head 5, both of which are double gap heads. The fixed head 3 is made up of heads $A_S$ and $B_S$ having respective gaps $3a$ and $3b$ with their azimuths directed oppositely, and the movable head 5 is made up of heads $A_D$ and $B_D$ having respective gaps $5a$ and $5b$ with their azimuths directed oppositely. The heads $A_S$ and $B_S$ (or the heads $A_D$ and $B_D$) are spaced apart from each other by one track pitch. The height h of the movable head 5 relative to the fixed head 3 can be adjusted under control of a voltage applied to the bimorph plate 4. When the movable head 5 is not biased, the difference in height between the A-azimuth heads $A_S$ and $A_D$ and the B-azimuth heads $B_S$ and $B_D$ of the fixed head 3 and the movable head 5 corresponds to a 120° rotation of the head drum 1, that is approximately one-third of the track pitch.

Figure 3:
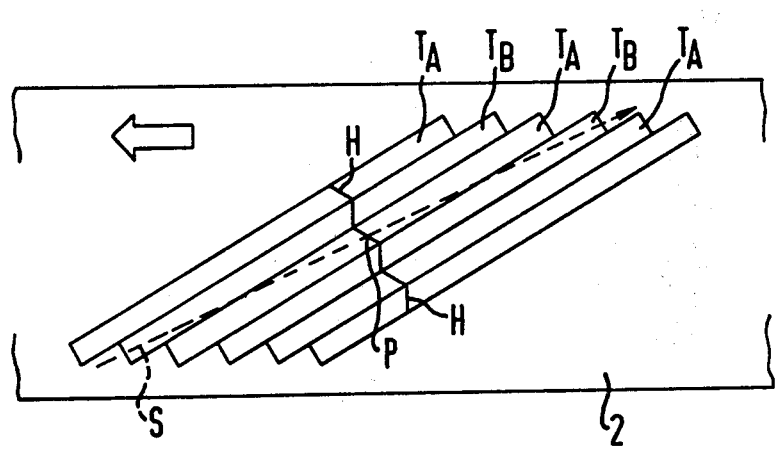
FIG. 3 is a view of a magnetic tape showing part of a pattern of tracks recorded by the fixed head of FIG. 2.

FIG. 3 is a view of the magnetic tape 2 showing track patterns traced by the fixed head 3 of FIG. 2. As shown, tracks $T_A$ and $T_B$ with recorded traces H (for example, for the horizontal sync. signal) with different azimuths are formed alternately and close to each other by the heads $A_S$ and $B_S$.

Figure 4:
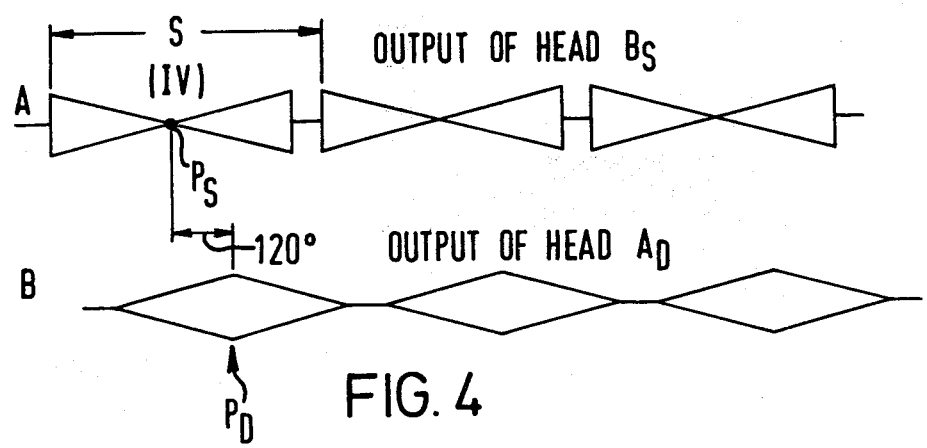
FIG. 4, consisting of A and B, is a waveform diagram showing the frequency modulated radio frequency output when the tape of FIG. 3 is reproduced at high speed.

FIG. 4 shows the radio frequency output (which is a frequency modulated wave) when the magnetic tape 2 of FIG. 3 is reproduced at high speed. In this case, the head scanning trace or path skews across more than the tracks $T_A$ and $T_B$ by an amount corresponding to two track pitches as shown by the dashed line S in FIG. 3. Accordingly, when the magnetic tape 2 is reproduced with the B-azimuth heads $B_S$ of the fixed head 3, the reproduction scanning path S will cross the opposite A-azimuth track $T_A$, as shown in FIG. 3, and the reproduced radio frequency output will fall to a minimum (substantially zero) when the head $B_S$ passes the centre P of the track $T_A$ as shown by a point $P_S$ in FIG. 4A. When the head output shown in FIG. 4A is used to reproduce a picture, band noise will appear due to loss of picture information at the point $P_S$. The fixed head $A_S$ produces an output waveform in the same phase relationship as the waveform of FIG. 4A for a scanning path spaced by one track pitch from that of the head $B_S$.

On the other hand, the movable head 5 produces a reproduced output with a 120° phase lag relative to the output of the fixed head 3. When the height of the A-azimuth movable head $A_D$ is adjusted so that its scanning path coincides with the scanning path S shown in FIG. 3, the output of the movable head $A_D$ becomes a maximum when the head $A_D$ passes the centre P of the track $T_A$. Accordingly, the radio frequency output of the movable head $A_D$ reaches a maximum level $P_D$ at a point approximately 120° after the minimum level point $P_S$ of the B-azimuth fixed head $B_S$, as shown in FIG. 4B. That is, the outputs of the fixed head $B_S$ and the movable head $A_D$ have an opposite phase relationship in their amplitude, when the 120° phase difference is neglected. Therefore, when the signals are processed such that the mechanical displacement (120°) of the picture signals of both heads is corrected, that is, their reproduced sync. signals are made to be in phase, so as to obtain two in-phase reproduced picture signals, that is, parallel simultaneous signals, the amplitude of one reproduced signal decreases in proportion to the increase in the amplitude of the other reproduced signal. Thus, one signal complements the other in respect of missing information, and it is possible to reproduce a picture at high speed without noise band interference.

It will be understood that with the adjustment of the height of the movable head 5 so that the scanning path of the movable head $A_D$ coincides with the scanning path of the fixed head $B_S$, the scanning paths of the other fixed head $A_S$ and of the movable head $B_D$ coincide with each other automatically, allowing the reproduction of odd number fields and even number fields by switching the heads $A_S$ and $B_D$.

Figure 5:
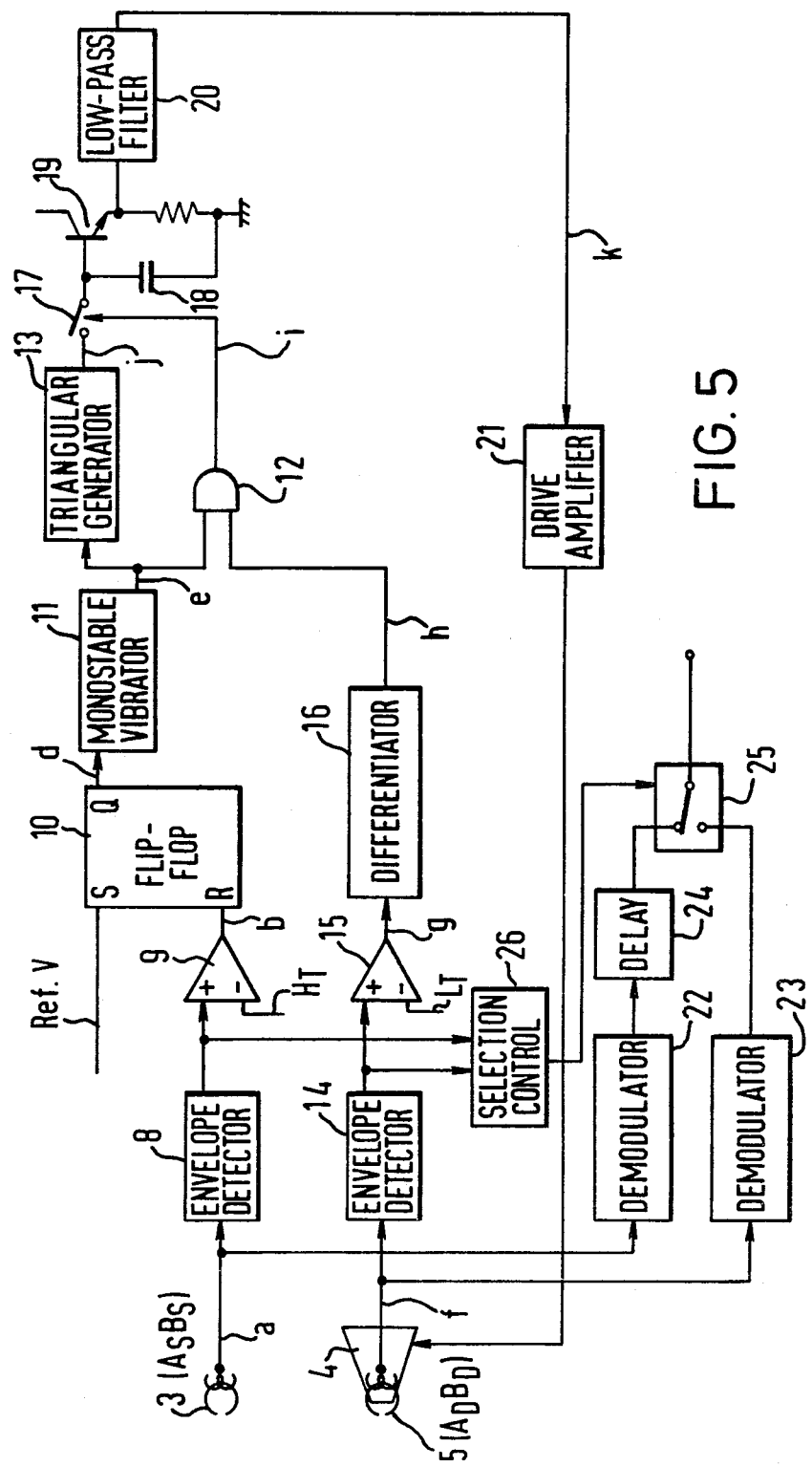
FIG. 5 is a block diagram of the invention.
Figure 6:
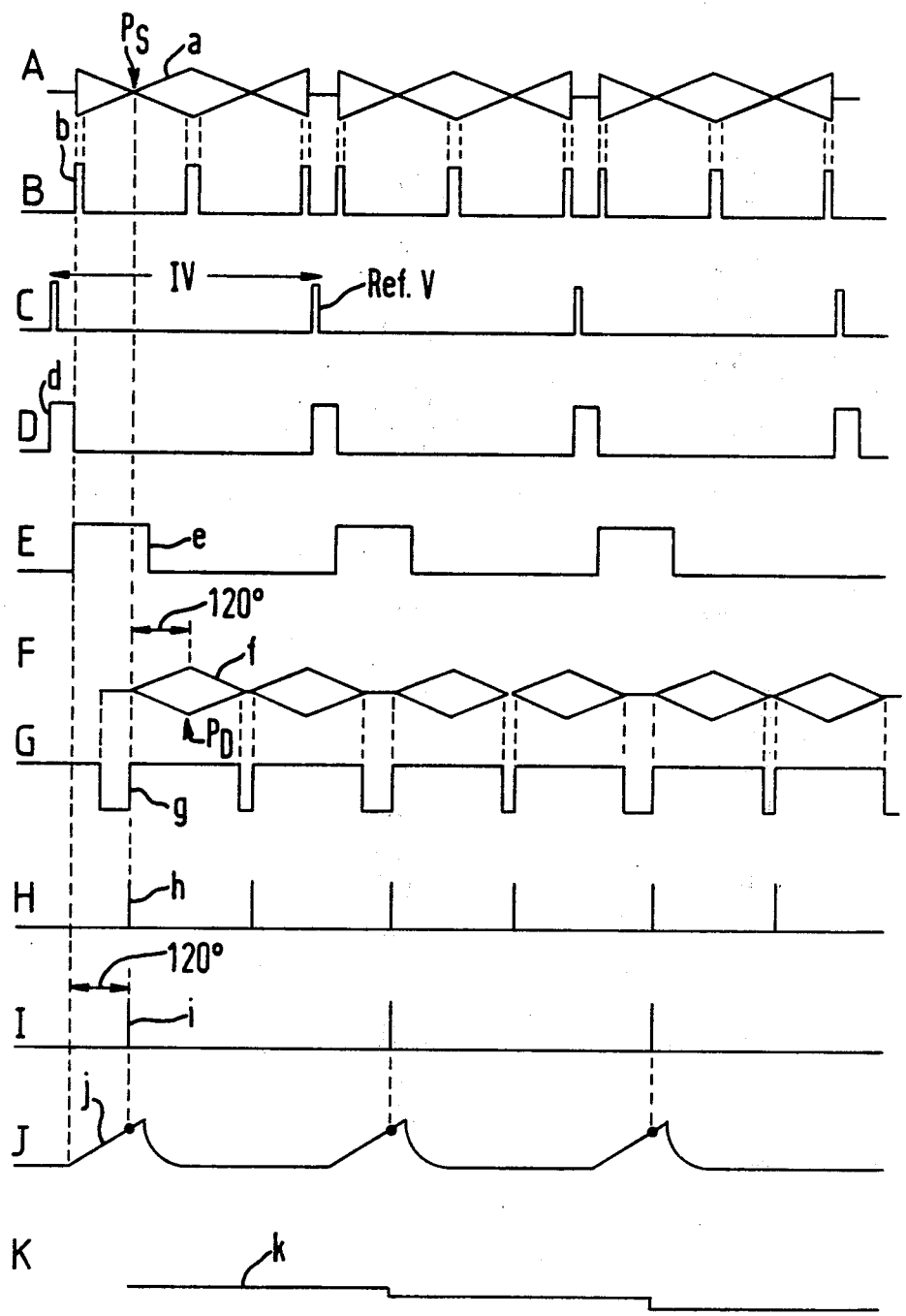
FIG. 6, consisting of A–K, is a waveform diagram used to explain the operation of the circuit of FIG. 5.

FIG. 5 is a block diagram of a head level control circuit for effecting the operation described above, and FIG. 6 is a set of waveforms for explaining the operation of the circuit.

In FIG. 5, the B-azimuth head $B_S$ of the fixed head 3 provides a radio frequency output a (FIG. 6A) shown in FIG. 4A. This output is supplied to an envelope detector circuit 8, and the detected output is then supplied to a level comparator 9. The level comparator 9 is supplied with a predetermined threshold signal HT, so that it supplies a detection signal b corresponding to the peak of the reproduced radio frequency output as shown in FIG. 6B. This peak detection signal b is supplied to the reset input of a flip-flop 10. The flip-flop 10 receives at its set input an external reference vertical sync. signal Ref.V (having a period of 1 V, that is, one vertical scanning period of the television signal), and produces at its output Q a pulse d which rises in response to the reference sync. signal Ref.V and falls in response to the subsequent peak detection signal b as shown in FIG. 6D. The pulse d is produced only once at the beginning of a track, and after that, when numerous peak detection signals b of FIG. 6B are generated as the head crosses numerous tracks during a head scanning period, these signals are rejected and no further pulse d is formed. That is, the falling edge of the pulse d represents the phase of the reproduced signal at the beginning of a track.

The output d from the flip-flop 10 is supplied to a monostable multivibrator 11, which produces at its output a signal e having a pulse width of 120°+α and starting at the beginning of the track as shown in FIG. 6E. The value of 120° corresponds to the phase difference between the fixed head 3 and the movable head 5, and equals one third of the vertical scanning period V. The value of α may be determined appropriately in the range from 10° to 20°. The signal e is supplied to an AND gate 12 for detecting the reproduced phase of the output of the movable head $A_D$ and is also supplied to a triangular wave generating circuit 13. On the other hand, the A-azimuth head $A_D$ of the movable head 5 mounted on the bimorph plate 4 provides a reproduced radio frequency output f as shown in FIG. 6F. The picture signal in the reproduced output f has a phase lag of 120° relative to the reproduced output of the fixed head (FIG. 6A), and it is controlled as will be described shortly such that the phase difference between the dip point $P_S$ of the fixed head output and the peak point $P_D$ of the movable head output (or the phase difference between the peak point of the fixed head output and the dip point of the movable head output) has the relation indicated in FIG. 4, that is, a phase difference of approximately 120°.

The output f from the A-azimuth head $A_D$ of the movable head 5 is supplied through an envelope detector circuit 14 to a level comparator 15. The level comparator 15 is supplied with a predetermined threshold signal $L_T$ and supplies a detection output g corresponding to the dip point of the reproduced output f as shown in FIG. 6G. The dip detection output g is supplied to a differentiation circuit 16, so that a pulse h is produced at its falling edge as shown in FIG. 6H. The differentiated output h is supplied to the AND gate 12 for gating with the output signal e from the monostable multivibrator 11, and only a differentiated pulse i included within the pulse width (120°+α) of the signal e is extracted as shown in FIG. 6I.

The extracted differentiation pulse i is supplied to a gate switch 17 as a gate pulse. The gate switch 17 receives at its input a triangular wave j of FIG. 6J derived by the triangular wave generating circuit 13 in response to the output e from the monostable multivibrator 11, and the level of the slope of the triangular wave j is sampled by the gate pulse i. The sampled voltage k (FIG. 6K) is stored in a holding capacitor 18 and supplied through a buffer transistor 19 and a low-pass filter 20 to a drive amplifier 21. The drive amplifier 21 amplifies the sampled and held voltage, and supplies the amplified voltage to the bimorph plate 4. The gain of the drive amplifier 21 is adjusted appropriately so that the height of the movable head $A_D$ is locked with the scanning path of the movable head $A_D$ coinciding with the scanning path of the fixed head $B_S$. In this state, the phase difference between the peak point of the reproduced output from the head $B_S$ and the dip point of the reproduced output from the movable head $A_D$ is approximately 120° as mentioned previously. Also, the same phase relationship exists between the dip point $P_S$ of the output from the head $B_S$ and the peak point $P_D$ of the output from the head $A_D$.

For example, if the dip point of the reproduced output from the head $A_D$ is located within a 120° phase difference, the pulse i in FIG. 6I will have a lead phase and a lower level portion of the triangular wave j in FIG. 6J will be sampled. Consequently, the sampled and held voltage k will fall, resulting in a decreased supply voltage to the bimorph plate 4. Thus the height of the movable head 5 is controlled so that the dip point is returned to the set point.

In this manner, the scanning path of the movable head 5 is controlled so that the peak point (or dip point) of the reproduced output from the fixed head 3 and the dip point (or peak point) of the reproduced output from the movable head 5 have the predetermined phase relationship.

In FIG. 5, the reproduced output a from the head $B_S$ and the reproduced output f from the head $A_D$ are supplied to frequency modulation demodulators 22 and 23, respectively, and demodulated to form picture signals. The output of the demodulator 22 is supplied to a delay circuit 24, and delayed by the amount corresponding to the mechanical phase difference (120°) between the fixed head 3 and the movable head 5. An inphase output component from the delay circuit 24 and the demodulator 23 is supplied to a selection switch 25, and one of the outputs is derived as the monitor output.

The selection switch 25 is supplied with a selection control signal from a selection control circuit 26. The selection control circuit 26 may be arranged such that it receives the outputs from the envelope detector circuits 8 and 14 and produces a predetermined selection control signal when the quantitative relationship between each detected output has reversed. Alternatively, the selection control circuit 26 may be arranged such that one demodulated picture signal is switched to another signal when the detected output level has fallen below the predetermined level.

It should be noted that the triangular wave j may be sampled at the peak point $P_D$ of the movable head output f in FIG. 6F to control the supply voltage to the bimorph plate 4, so that it has a certain phase difference (for example 120°) from the dip point $P_S$ of the fixed head output a in FIG. 6A.

In the above embodiment, the movable head 5 is controlled so that it scans the same path as that of the fixed head 3, however, it may be controlled so that the dip point of the fixed head output amplitude and the peak point of the movable head output amplitude have a suitable phase difference such as, for example, 80° to 100°. In this case, the path of the movable head 5 does not coincide with the path of the fixed head 3. The optimum height of the movable head 5 varies depending on the mechanical phase difference between the fixed and movable heads 3 and 5, and it will possibly occur that the reproduced outputs of the fixed and movable heads 3 and 5 complement each other when the path of the movable head 5 is spaced from the path of the fixed head 3 by one track pitch.

Embodiments of the invention can be used in reproducing from a magnetic tape which has been recorded with a guard band (signal inhibited band) between adjacent tracks. In this case, the scanning path of the movable head 5 can be selected such that it does not cross the guard band at the position where the fixed head 3 scans across the guard band. Also in this case, the scanning paths of the fixed and movable heads 3 and 5 do not coincide with each other.

In the above embodiment, the outputs of the fixed and movable heads 3 and 5 are selected by the selection switch 25 so that they complement each other. However, the outputs may be complemented by adding or combining these head outputs.

Moreover, the invention can be applied to a VTR having a fixed head pair and a movable head pair for performing azimuth recording and reproduction. For a digital VTR in which the analog television signal is converted to digital form for recording, and sampling positional data, that is address data, is recorded simultaneously therewith, a field memory may be provided for storing the better one of the fixed head output and the movable head output in correspondence with the appropriate address in the memory, whereby complementing is performed automatically during a memory write operation. In this case, the delay circuit 24 and the selection switch 25 in the circuit of FIG. 5 are unnecessary.

As described above, therefore, the scanning path of the movable head 5 is controlled such that a low level portion of the reproduced signal from either the fixed head 3 or the movable head 5 on the rotary head drum 1 is complemented by the reproduced signal of the other head. This means that when one head scans the magnetic tape 2 across a guard band or across a track having an azimuth different from that of the head during high-speed reproduction, causing the level of the reproduced signal to fall significantly, it can be complemented by the reproduced signal of another head, whereby a high quality high-speed reproduction picture without band noise can be obtained.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:
1. A video signal reproducing apparatus comprising:
a fixed head mounted on a rotary head drum and a movable head supported on said rotary head drum so as to have a predetermined phase difference relative to said fixed head and supported by a position control means so that the position of said movable head can be controlled in the traverse direction of a skew track formed on a magnetic tape;
phase matching means for matching the phase of a reproduced signal from said fixed head and a reproduced signal from said movable head;
means for adjusting the scanning path of said movable head relative to the scanning path of said fixed head by controlling said position control means such that a reduction in one reproduced signal level causes an increase in the other reproduced signal level in said phase-matched state during high-speed reproduction; and means for complementing one reproduced signal with the other reproduced signal for lower level portions.

2. Apparatus according to claim 1 wherein said reproduced signals from said fixed head and said movable head are demodulated and supplied by way of said phase matching means and directly, respectively, to a selection switch which passes one only of said demodulated reproduced signals.

3. Apparatus according to claim 2 wherein said reproduced signals from said fixed head and said movable head are also supplied to respective envelope detector circuits, the outputs of which are supplied to a selection control means for deriving a control signal to control said selection switch.

4. Apparatus according to claim 3 wherein said outputs of said envelope detector circuits are also supplied by way of level comparison means to drive signal deriving means for deriving a drive signal for supply by way of a drive amplifier to said positional control means.

5. Apparatus according to claim 1 wherein said reproduced signals from said fixed head and said movable head are digital signals which are supplied by way of said phase matching means and directly, respectively, to a memory means for selectively storing only one of said digital signals.

6. Apparatus according to claim 1 wherein said position control means is a bimorph plate on which said movable head is mounted.

* * * * *